Nov. 21, 1950     C. A. SIGEL     2,530,666
VEHICLE VENTILATOR OPERATOR
Filed June 10, 1949     3 Sheets-Sheet 1
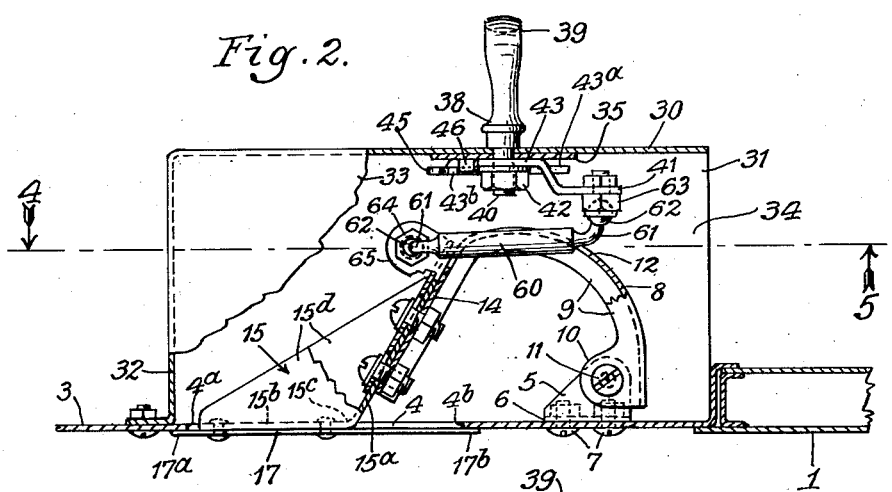
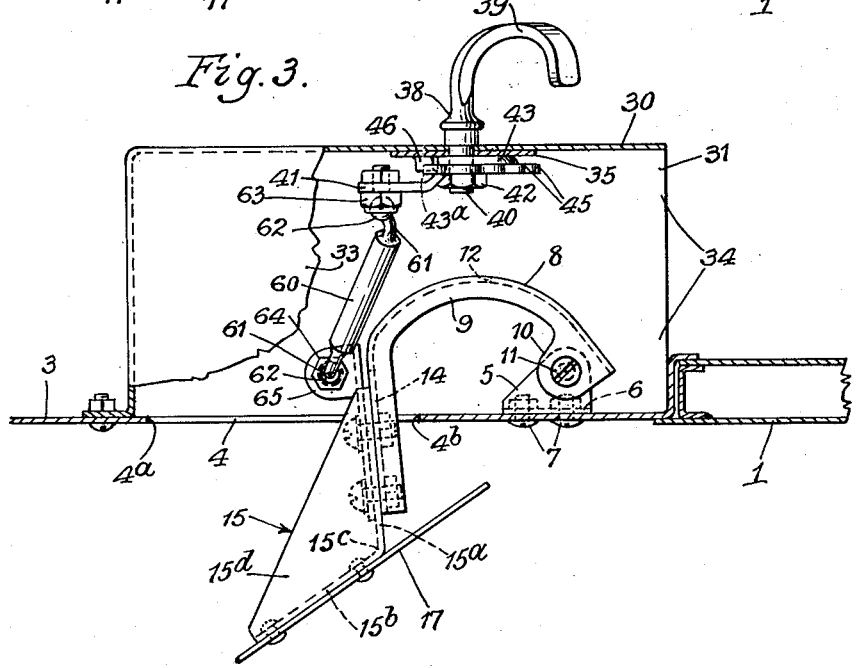
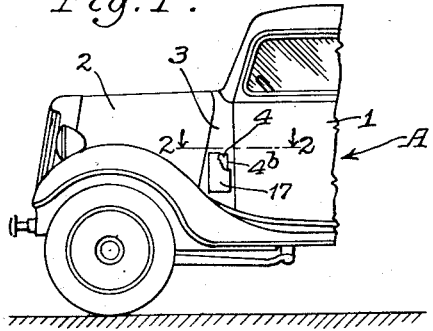
Inventor
Carl A. Sigel
by Parker & Carter
Attorneys.

Nov. 21, 1950 — C. A. SIGEL — 2,530,666
VEHICLE VENTILATOR OPERATOR
Filed June 10, 1949 — 3 Sheets-Sheet 2

Inventor
Carl A. Sigel
by Parker & Carter
Attorneys.

Nov. 21, 1950 — C. A. SIGEL — 2,530,666
VEHICLE VENTILATOR OPERATOR
Filed June 10, 1949 — 3 Sheets-Sheet 3
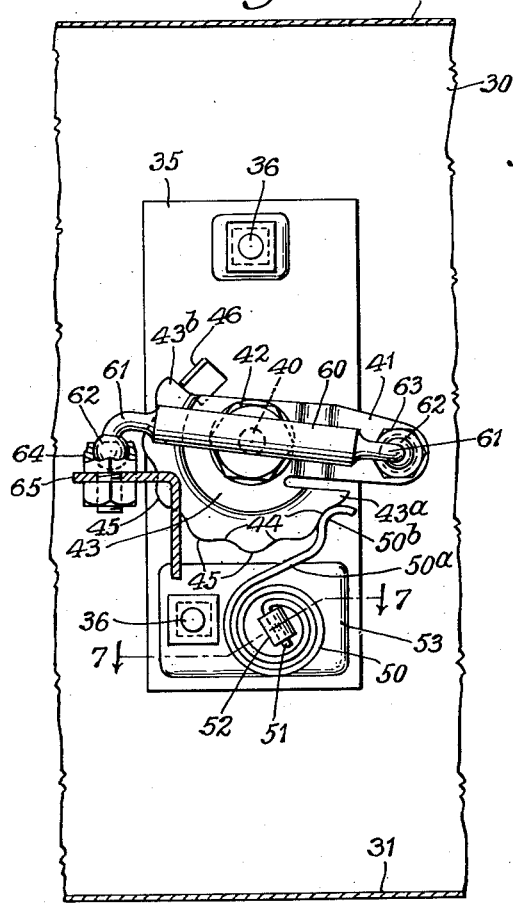
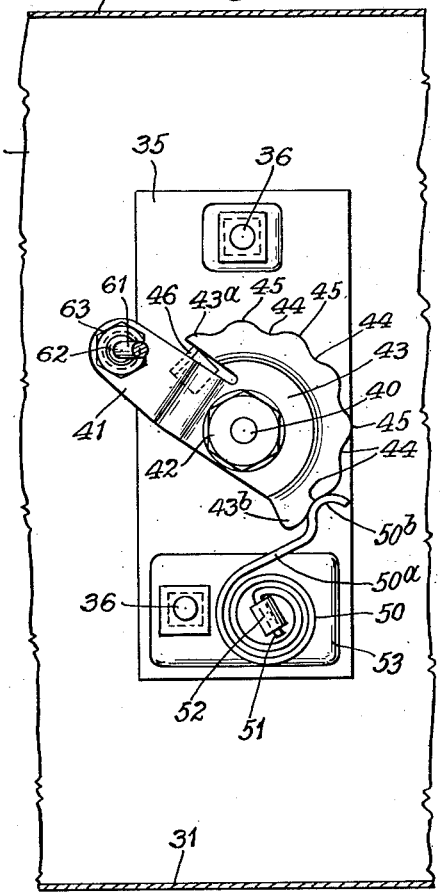
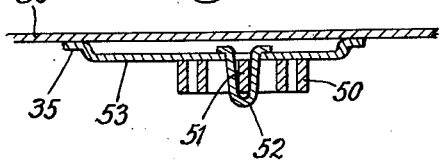
Inventor
Carl A. Sigel
by Parker & Carter
Attorneys.

Patented Nov. 21, 1950

2,530,666

UNITED STATES PATENT OFFICE 2,530,666

VEHICLE VENTILATOR OPERATOR

Carl A. Sigel, Chicago, Ill., assignor to Chicago Forging and Manufacturing Company, Chicago, Ill., a corporation of Illinois Application June 10, 1949, Serial No. 98,270

2 Claims. (Cl. 268—30)

My invention relates to an improvement in vehicle ventilators, and has for one purpose the provision of an improved ventilator for trucks and the like.

Another purpose is to provide an improved ventilator which gives access to the foot space, or to the lower part of the seating space, of a truck or other vehicle.

Another purpose is to provide an improved ventilator whereby an aperture in an outer wall may be opened and closed readily and efficiently from within the wall.

Another purpose is to provide an improved actuating connection for the hinged members, including ventilators.

Other purposes will appear from time to time in the course of the specification and claims.

I illustrate my invention more or less diagrammatically in the accompanying drawings wherein:

Figure 1 is a side elevation of the front of a vehicle in which my invention is employed;

Figure 2 is a section on an enlarged scale on the line 2—2 of Figure 1, illustrating the ventilator closed;

Figure 3 is a similar section illustrating the ventilator open;

Figure 5 is a section on the line 4—5 of Figure 2, looking in the direction of the arrow marked 5, with the ventilator closed;

Figure 6 is a view similar to Figure 5, with the ventilator open; and

Figure 7 is a section on the line 7—7 of Figure 5.

Like parts are indicated by like symbols throughout the specification and drawings.

Figure 4:
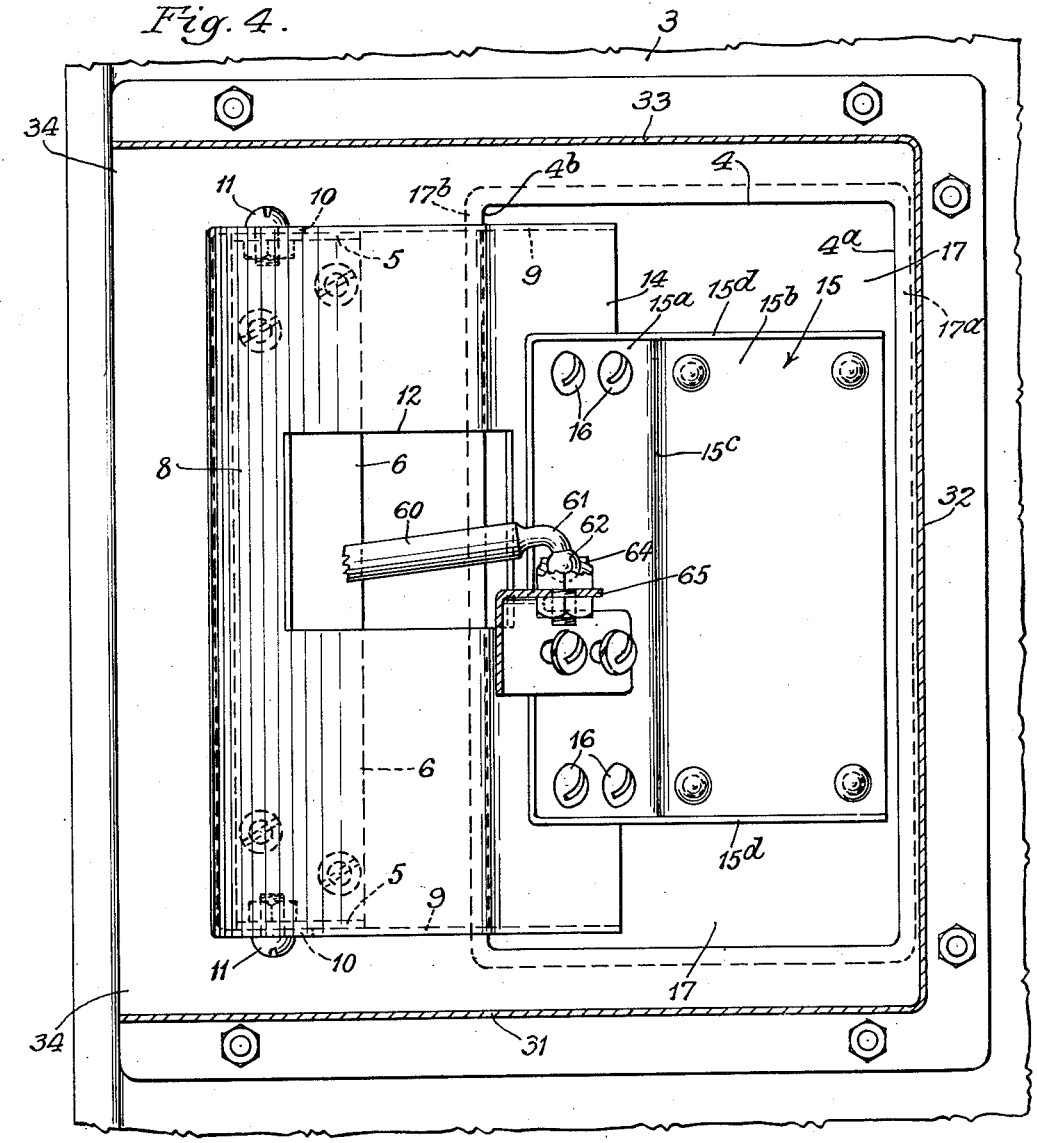
Figure 4 is a section on the line 4—5 of Figure 2, looking in the direction of the arrow marked 4.

Referring to the drawings, A generally indicates a vehicle, such as an automobile or truck. 1 illustrates the vehicle door and 2 the vehicle hood or hood closure. 3 illustrates the fixed cowl structure. The cowl structure is shown as provided with an aperture 4, herein shown as rectangular, but which may be made of any suitable form. This aperture is defined between a front edge 4a and a rear edge 4b. Positioned to the rear of the edge 4b is a bracket structure or structures which include ears or brackets 5 and a flange or flanges 6, secured to the inner surface of the cowl 3 by any suitable screws, bolts or securing means, generally indicated at 7. The bracket structure thus described is positioned a substantial distance rearwardly of the rear edge 4b of the aperture 4.

Mounted for rotation on said brackets or flanges 5 is a curvilinear closure support, generally indicated as 8. It may have reinforcements or flanges 9 along its upper and lower edges, and has top and bottom ears 10 through which any suitable pivot members 11 may extend, whereby the support 8 is mounted for rotation about a generally vertical axis, this axis being somewhat inwardly from the cowl 3 and somewhat rearwardly of the side or air inlet aperture 4. As will be clear, for example, from Figure 4, the support has an intermediate aperture 12 of substantial size, the purpose of which will later appear.

Whereas the rearward and inward part of the member 8 is shown as arcuately formed, a non-arcuate forward extension is provided, generally indicated at 14. Associated with it are reinforcing brackets 15. The brackets may be formed in any suitable way, but I may, for example, employ a species of truss formed of side portions 15a and 15b, intersecting at 15c, and connected by end webs 15d. The reinforcement or bracket or support thus formed is shown as secured to the support portion 14 by any suitable screws or securing means 16. Abutting against the wall or portion 15b is the closure 17. The parts are so proportioned that when the support 8 is rotated about its vertical pivot 11 to the position in which it is shown in Figure 2, the closure 17 snugly closes the aperture 4, its edges overlying and abutting against the edges of the aperture, as at 17a and 17b. It will be understood, of course, that the upper and lower edges of the aperture are similarly masked, whereby a sufficiently tight closure is provided when the parts are moved from the open position of Figure 3 to the closed position of Figure 2.

I find it convenient to provide an inner air box within the aperture, a wall of such air box comprising a convenient base upon which to position the below described actuating structure for controlling the position of the closure 17. It will be understood that the air box, as such, may be eliminated, but some inner wall or support must be provided for the below described actuating mechanism. In the structure as shown the box includes an inner wall 30, shown as generally parallel with the cowl wall and spaced several inches inwardly therefrom. When I employ an air box, the edge walls 31, 32 and 33 constitute a convenient support for the rear wall 30, and the air inlet aperture or space 34 remains open and communicates with the interior of the car.

Positioned within and preferably removably secured to the inner surface of the wall 30 I provide a base plate 35. Any suitable screws or bolts 36 may be employed for holding it in position, the details of such bolts not constituting, of themselves, part of the present invention. Extending through the wall 30 I illustrate a handle, generally indicated as 38. This handle includes a hand-engaging portion or lever 39 and an inwardly extending portion 40 which extends through the plate 35 and has secured thereto an actuating lever 41. This lever may be secured to the handle, for example, by the nut 42, the parts being so proportioned as to prevent relative rotation of the handle 39 and the lever 41. The lever includes a segmental portion 43, the exterior edge of which is formed with a plurality of notches 44, separated by rounded projections 45. The lever 41 is somewhat inwardly offset from the segmental plate 43, as will be clear, for example, from Figures 2 and 3.

46 is a limit stop which may be inwardly offset from or formed on the base plate 35. When the parts are in open position the stop is engaged by an end 43a of the segmental plate 43. This limits the movement of the lever 41 to the opening position. When the parts are rotated from the open position of Figure 6 to the closed position of Figure 5 the opposite end of the segmental plate, as at 43b, engages the opposite side of the stop 46.

The parts may be adjusted into a number of intermediate positions by the employment of a stop spring generally indicated as 50, which has an inner end dead-ended as at 51 on a projection 52 from the elevated portion or escutcheon 53 of the base plate 35. The spring 50 is shown as formed in a spiral, with an elongated or generally tangential free end 50a which terminates in a portion 50b formed to enter selectively any one of the notches 44 of the segmental plate 43. The spring 50 is preferably of sufficient strength to hold the lever 41 against unintended movement, with the spring portion 50b entering any one of the notches 44.

The handle rotates about an axis which is perpendicular to a plane in which the axis of the closure 17 is included. The rotation of the handle results in a corresponding rotation of the closure, made possible by the use of a connecting rod or pin 60 which has at each end an offset portion 61 terminating in a ball 62. Each such ball is received, respectively, in a socket 63 on the lever 41 and a socket 64 mounted on a lug or ear 65 on the supporting structure 14. The aperture 12 permits the connecting pin 60 to move inwardly, outwardly, upwardly and downwardly, in the course of its compound movement, without interfering with the position of the support 8. The parts are so proportioned that when the handle is in the closed position of Figures 2 and 5 the lever 41 has passed over dead center and is held in locked position with the segmental plate 43 in the position of Figure 5, and with the spring 50 exerting a thrust of the member 50b into the terminal notch 44.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In automobiles and, particularly, in larger automotive vehicles, such as trucks, the provision of an entering flow of ventilating air to the interior of the cab is of importance. I find it advantageous to provide an aperture located adjacent the foot level, so that cold outside air will be delivered about the foot of the user and across the heated floor plate. I also find it advantageous to provide a closure for the air inlet which, when open, serves as an air scoop or air directing means, at least to some degree. The employment of a wind box or air directing interior housing is a matter of choice, but I find it advantageous to employ, as a support for the actuating means, a wall which is generally parallel with the cowl wall, which is spaced inwardly therefrom, and which inwardly masks the aperture. In the particular closure means I employ I translate a rotation about a horizontal axis into rotation about a vertical axis by a pin or compression-tension member, having a universal joint at each end. The particular ball-and-socket structure herein shown is convenient, but not obligatory.

Whereas I find it advantageous to move the lever 41 over dead center in the locking position, it will be understood that I may make the spring 50 so powerful as to make movement over dead center unimportant. I consider it important to have the spring 50 of sufficient strength so that it will hold the parts at any intermediate position, with the closure partly open. When in such position, the air pressure against the closure is not effective to apply any particular turning moment to the handle. There is, therefore, no tendency for the inrush of air to cause an unintended rotation of the handle or an unintended movement of the closure 17.

I claim:

1. In a manually operable ventilator closure for car bodies and the like adapted to be actuated by a rider seated in the car, a deflecting and supporting structure positioned within the car body and including a wall generally parallel with the side wall of the car body and spaced inwardly therefrom, the side wall of the car body having an air inlet aperture aligned therewith, a closure for said air inlet aperture and a support therefor including a movable member having an inner end portion hinged within the car body and outer end portion, to which the closure is secured, adapted to extend outwardly through the air inlet aperture when the closure is in open position, a hinge support positioned within the car body, the inner end of the movable member being pivoted for rotation in relation thereto about an axis lying in a plane generally parallel with but positioned inwardly of the side wall of the car body, and actuating means for the closure including a handle mounted on said wall of the supporting structure for rotation about an axis generally perpendicular to the axis of the movable member, said handle projecting inwardly from the said wall, a lever on the opposite side of said wall mounted for rotation in unison with the handle, and an actuating connection between said lever and said closure including a rod, a universal connection between one end of said rod and the closure, and a universal connection between the opposite end of said rod and the lever.

2. The structure of claim 1 characterized by and including a locking connection adapted to lock said closure against unintended movement, said locking connection including a notched segment and a coil spring, the coil spring having a free end positioned and adapted to enter selectively the notches of said segment in locking relationship therewith.

CARL A. SIGEL.

REFERENCES CITED

The following references are of record in the file of this patent:

UNITED STATES PATENTS

| Number | Name | Date |
|---|---|---|
| 661,838 | Adams | Nov. 13, 1900 |
| 1,496,934 | Holtz | June 10, 1924 |
| 1,505,528 | Belden | Aug. 19, 1924 |
| 2,017,528 | Chutorash | Oct. 15, 1935 |
| 2,093,036 | Dickason | Sept. 14, 1937 |
| 2,151,748 | Dean | Mar. 28, 1939 |
| 2,311,300 | Dubour | Feb. 16, 1943 |